(12) United States Patent
Wimmer et al.

(10) Patent No.: US 8,578,568 B2
(45) Date of Patent: Nov. 12, 2013

(54) CLIP FOR FASTENING A STRIP OR RIB

(75) Inventors: Karin Wimmer, Bad Nauheim (DE); Jens Albach, Hungen (DE); Hans-Peter Seng, Reiskirchen (DE); Wolfgang Gerlach, Biebertal (DE); Bastian Stau, Weimar (DE); Michael Schmidt, Frenwald (DE)

(73) Assignee: Newfrey LLC, Newark, DE (US)

( * ) Notice: Subject to any disclaimer, the term of this patent is extended or adjusted under 35 U.S.C. 154(b) by 90 days.

(21) Appl. No.: 13/175,105

(22) Filed: Jul. 1, 2011

(65) Prior Publication Data

US 2012/0010638 A1    Jan. 12, 2012

(30) Foreign Application Priority Data

Jul. 7, 2010  (DE) .................. 20 2010 008 001 U

(51) Int. Cl.
*F16B 5/12*    (2006.01)
(52) U.S. Cl.
USPC ............................................. 24/297; 24/457
(58) Field of Classification Search
USPC ........... 24/297, 453, 457, 458, 530, 545, 555, 24/556, 564, 560–562; 411/508–510; 296/1.08, 39.1, 214, 146.7; 403/408.1; 52/718.03, 718.06, 716.7
See application file for complete search history.

(56) References Cited

U.S. PATENT DOCUMENTS

| | | | |
|---|---|---|---|
| 5,051,021 A | 9/1991 | Peltz | |
| 5,347,691 A | 9/1994 | Terazoe | |
| 7,204,000 B2 | 4/2007 | Benedetti | |
| 7,552,516 B2 * | 6/2009 | Okada et al. | 24/297 |
| 2002/0001502 A1 | 1/2002 | Smith | |
| 2002/0004971 A1 | 1/2002 | Ichimaru | |
| 2007/0033774 A1 | 2/2007 | Okada | |

FOREIGN PATENT DOCUMENTS

| | | |
|---|---|---|
| DE | 7208856 U | 8/1972 |
| DE | 3916542 A | 11/1990 |
| DE | 4300113 A | 7/1993 |
| DE | 29607882 U | 7/1996 |
| DE | 19634246 A | 2/1998 |
| EP | 0432855 A | 6/1991 |
| EP | 1211115 B | 1/2007 |
| FR | 1220181 A | 5/1960 |
| JP | 2006015781 A | 1/2006 |

OTHER PUBLICATIONS

EP Search Report dated Mar. 8, 2013.

* cited by examiner

*Primary Examiner* — James Brittain
(74) *Attorney, Agent, or Firm* — Michael P. Leary

(57) ABSTRACT

In a clip for fastening to a strip or rib, in particular on a motor vehicle, having a single-piece body made of plastic that has a retaining region, the retaining region has a receiving slot with an insertion opening and a locking finger. The locking finger is attached to a first guide section and extends from its fastening end in the insertion direction and in the direction of a second guide section. The locking finger has an insert that forms a tongue projecting from the free end of the locking finger.

20 Claims, 2 Drawing Sheets

CLIP FOR FASTENING A STRIP OR RIB

CROSS-REFERENCE TO RELATED APPLICATIONS

This application claims the benefit of German Patent Application No. 102008022337.9, filed Apr. 29, 2008 the disclosure of which is incorporated herein by reference.

BACKGROUND OF THE INVENTION

The invention concerns a clip for fastening to a strip or a rib, in particular to a component of a motor vehicle, having a single-piece body made of plastic that has a retaining region, wherein the retaining region has a receiving slot with an insertion opening, a first and a second guide section, and at least one locking finger that is attached to the first guide section and extends from its fastening end in the insertion direction and in the direction of the second guide section.

From EP 1,211,115 B1 is known a clip of the specified type for fastening a strip, in particular a trim strip for a motor vehicle. The clip has a retaining part with a receiving slot into which obliquely projects at least one latching finger that has a latching opening at its free end. A snap-on part intended for insertion in the receiving slot has a projection with a plurality of latching tabs, which latch with a latching opening of the latching finger when the projection is inserted in the receiving slot of the retaining part. The latching finger here is designed and aligned such that it can give way to the latching tabs during insertion of the projection into the receiving slot, but prevents the snap-on part from being pulled out when the latching tabs are latched into the latching openings. In order to fasten it to a component, the retaining part has fastening apertures that studs welded onto the component engage with. The prior art clip is only suitable for snap-on parts with latching tabs or a comparable undercut.

It is also known, from DE 4,300,113 A1, to use clamps made of stainless steel to fasten mounted parts to a rib. The clamps are bent in a U-shape, and have a receiving slot into which project clamping plates with sawtooth gripping teeth at their free ends. In this solution, the component to be fastened to the rib is provided with specially designed retaining parts inside which the clamps must be placed prior to assembly. Because of the stainless steel clamps, the prior art fastening arrangement is relatively expensive, and requires higher assembly forces as compared to fastenings with plastic clips.

In addition, a clip suitable for use in motor vehicles is known from U.S. Pat. No. 7,204,000 B2, which consists of a metal clamp and a plastic body molded onto the clamp by an injection molding process, which forms posts that can be inserted into an opening and a flexible skirt. In this design, the metal clamp constitutes the main part of the clip. In addition to weight disadvantages, the cost of corrosion protection for the clamp by means of coating or the use of stainless steel is disadvantageous.

BRIEF SUMMARY OF THE INVENTION

The object of the invention is to create a clip of the initially mentioned type that achieves low assembly forces and comparatively high retention forces, even in conjunction with strips or ribs that have no undercut. In addition, the clip should be corrosion-resistant and suitable for manual installation. Moreover, the clip should be economical to manufacture.

This object is attained by a clip for fastening to a component, in particular a strip or rib on a motor vehicle, the clip comprising: a single-piece body made of plastic and including a retaining region; a receiving slot partially defined by the retaining region and extending axially in the insertion direction, the receiving slot including; an insertion opening; a first guide section and a second guide section; and a first locking finger attached to the first guide section and extending from a fastening end to a free end axially in the insertion direction and transversely toward the second guide section, and the first locking finger includes an insert with a tongue portion projecting from the free end of the first locking finger; and wherein the first locking finger is located in an opening partially defined by the first guide section and is connected to the first guide section by an elastically deformable web.

According to the invention, the clip has a single-piece body made of plastic that has a retaining region, wherein the retaining region has a receiving slot with an insertion opening, a first and a second guide section, and at least one locking finger that is attached to the first guide section and extends obliquely from its fastening end in the insertion direction and in the direction of the second guide section, wherein the first locking finger has an insert that forms a tongue projecting from the free end of the first locking finger.

The clip according to the invention combines the desirable characteristics of a plastic clip with the desirable characteristics of a metal clamp in an especially advantageous manner. The tongue of the insert, which forms the free end of the locking finger, can be made of a harder material than the clip, for example metal, and also provides high retention forces for strips or ribs having no undercut, which is to say a high resistance to pull-out of a strip or rib inserted in the receiving slot. On the other hand, the greater elasticity of the fastening of the plastic locking finger and the favorable sliding properties of the plastic advantageously permit low assembly forces, so that insertion of the strips or ribs can also be done manually. The metal content of the clip is very small. The weight of the clip is thus only negligibly greater than that of a clip made entirely of plastic, and the material costs remain low even when inserts made of stainless steel are used. The insert can have a simple shape and can be introduced into the locking finger of the clip during the molding of the clip by placement in the mold ahead of time. The insert is embedded in the plastic material of the clip except for the projecting tongue. There are thus no external sharp edges that could cause injury during installation of the clip by hand. Optimal corrosion resistance of the clip can be achieved through the use of inserts made of corrosion-resistant metal or another corrosion-resistant material, for example a plastic reinforced with glass fibers or carbon fibers.

Especially advantageous is a design of the clips in which the first locking finger is located in an opening of the first guide section and is connected to the first guide section by elastically deformable webs. The resilience of the locking finger, and hence the assembly and retaining force, can be adapted to the applicable requirements by means of the dimensioning of the elastically deformable webs.

According to another proposal of the invention, the elasticity of the deformable webs and their breaking strength can be favorably influenced by the means that the insert has lateral shoulders, which extend through the webs and are embedded in regions of the first guide section adjacent to the locking finger.

According to another proposal of the invention, provision can be made for the first and second guide sections to be connected to one another by a rear section, located opposite the insertion opening, which has a stop for limiting the depth of the receiving slot in the insertion direction.

It is especially advantageous for the stop of the rear section to be provided with multiple steps arranged in a staircase fashion whose distance from the insertion opening decreases with increasing distance from the second guide section. The end faces of the steps opposite the second guide section form supports for edge regions of strips or ribs of different thicknesses which come into contact with the stop and can prevent tilting of strips or ribs in the receiving slot, when said strips or ribs have a thickness that is less than the width of the receiving slot.

According to another proposal of the invention, the clip can have an anchoring region with a keyhole-shaped fastening aperture for receiving a T-stud located on the support part and can have, associated with the fastening aperture, a second locking finger by which the T-stud can be held in place in the fastening aperture. A stable and easy-to-assemble anchoring of the clip to a support part is accomplished by this means.

A design of the clip is preferred in which two retaining regions are provided that are connected to one another by the anchoring region located between them. In this design, the anchoring region can connect the second guide sections of the two retaining regions, with the first guide sections being connected to one another by a web on the side of the receiving slot opposite the anchoring region.

According to another proposal of the invention, elastic arms extending in directions that diverge and extend away from the guide sections can be located on the rear section. By means of the elastic arms, the clip can be guided during assembly and supported, free of play, against rotation about the T-stud engaging in the anchoring region. In addition, the elastic arms permit tolerance compensation in the anchoring position of the clip on the support part.

In order to anchor the insert in the first locking finger in an interlocking manner, according to another proposal of the invention the insert can have an opening or edge recesses into which the plastic has penetrated. Moreover, to simplify manufacture of the clip, the fastening end of the locking finger can have a recess in which an edge region of the insert is exposed. By this means, the insert can be held and supported in the injection mold at the tongue and at the edge region exposed in the recess, so that the insert can be easily placed in the injection mold, precisely positioned in the injection mold, and secured against displacement during the injection molding process.

BRIEF DESCRIPTION OF THE SEVERAL VIEWS OF THE DRAWING

The invention is explained in detail below with reference to exemplary embodiments that are shown in the drawings. They show.

DETAILED DESCRIPTION OF THE PREFERRED EMBODIMENTS

Figure 1:
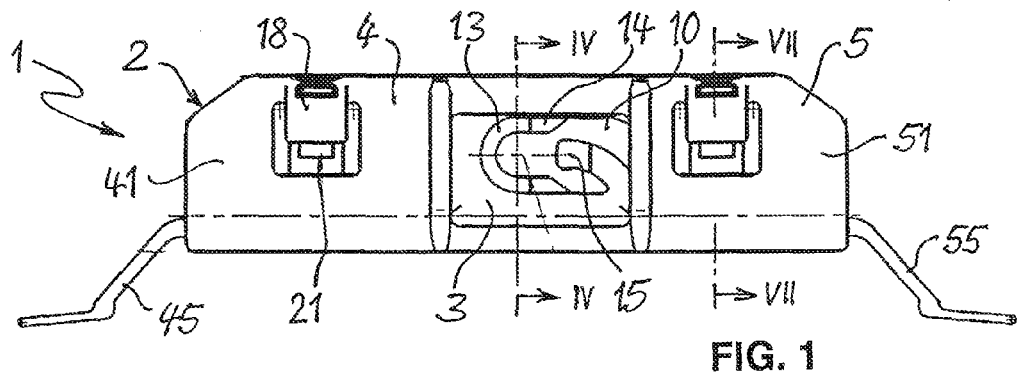
FIG. 1 a view of a clip according to the invention with first guide section facing the viewer, FIG. 2 a view of the insertion side of the clip from FIG. 1, FIG. 3 a view of the clip from FIG. 1 with second guide section facing the viewer, FIG. 4 a cross-section IV-IV of the clip from FIG. 1, FIG. 5 an end view of the clip from FIG. 1, FIG. 6 a perspective view of the clip from FIG. 1 with first guide section facing the viewer, FIG. 7 a cross-section VII-VII of the clip from FIG. 1, and FIG. 8 an end view of another embodiment of a clip according to the invention.
Figure 2:
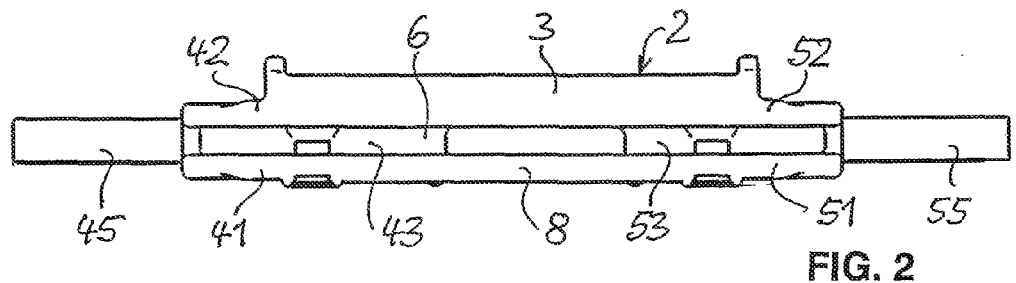

The clip 1 shown in FIGS. 1 through 7 consists primarily of a body 2 made of plastic, which has an anchoring region 3 located essentially in the center and retaining regions 4, 5 on both sides of the anchoring region 3. The retaining regions 4, 5 have a U-shaped profile, which is composed of parallel first and second guide sections 41, 42 or 51, 52 and a rear section 43 or 53 connecting them. Extending between the guide sections 41, 42, 51, 52 is a receiving slot 6 with an insertion opening 7 opposite the rear sections 43, 53. The anchoring region 3 connects the second guide sections 42, 52 and delimits the receiving slot 6 and the insertion opening 7 between them. The first guide sections 41, 51 are connected together by a web 8 that delimits the insertion opening 7 between the guide sections 41, 51. Between the rear sections 43, 53 extends a rib 9 that is connected to the anchoring region 3 and has the purpose of reinforcing the body 2. The end faces of the retaining regions 4, 5 facing away from one another have end walls 44, 54, which join the guide sections 41, 42 or 51, 52 over a length corresponding to approximately half the depth of the receiving slot 6, and oppose a widening of the receiving slot 6. Molded onto the outer side of the end walls 44, 54 as an extension of the rear sections 43, 53 are elastic arms 45 and 55, which extend outward and in the direction opposite the guide sections 41, 42 at an angle of approximately 45° to the longitudinal axis of the rear sections 43, 53. The free ends of the elastic arms 45, 55 are angled, producing a larger support surface. With the aid of the spring arms 45, 55, the clip 1 can brace against a component.

The anchoring region 3 has a keyhole-shaped fastening aperture 10 with a U-shaped retaining section 11 and a lead-in section 12. The retaining section 11 has a step 13 in the shape of a semicircle, the ends of which are adjoined by lead-in ramps 14. Projecting into the lead-in section 12 is an elastic, second locking finger 15, whose end is located opposite the retaining section 11. When a T-stud is inserted head-first into the lead-in section 12 from the back of the anchoring region 3, the locking finger 15 can be pushed out of the lead-in section 12 far enough that the head can reach the step 13 via the lead-in ramps 14 by displacement of the T-stud into the retaining section 11. As soon as the T-stud is located fully inside the retaining section 11, the locking finger 15 slides down from the head of the T-stud and springs back to its initial position in which it is located opposite the circumferential surface of the head and thereby prevents the T-stud from sliding out of the retaining section 11.

Figure 3:
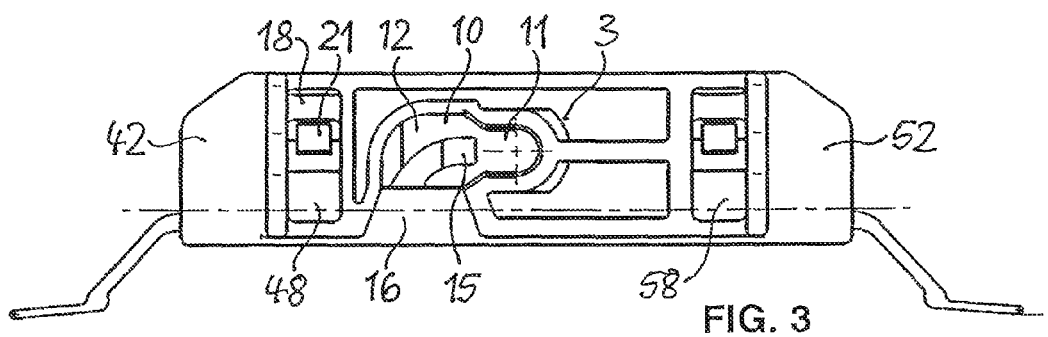
Figure 4:
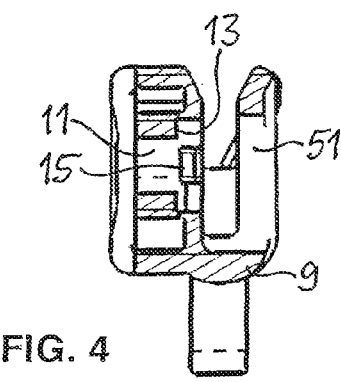
Figure 5:
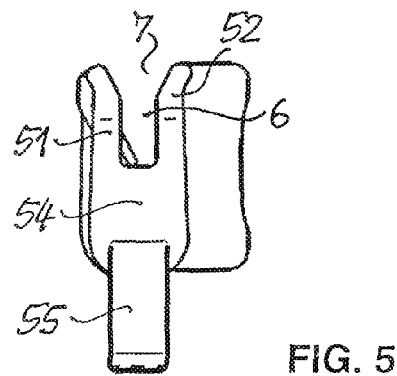
Figure 6:
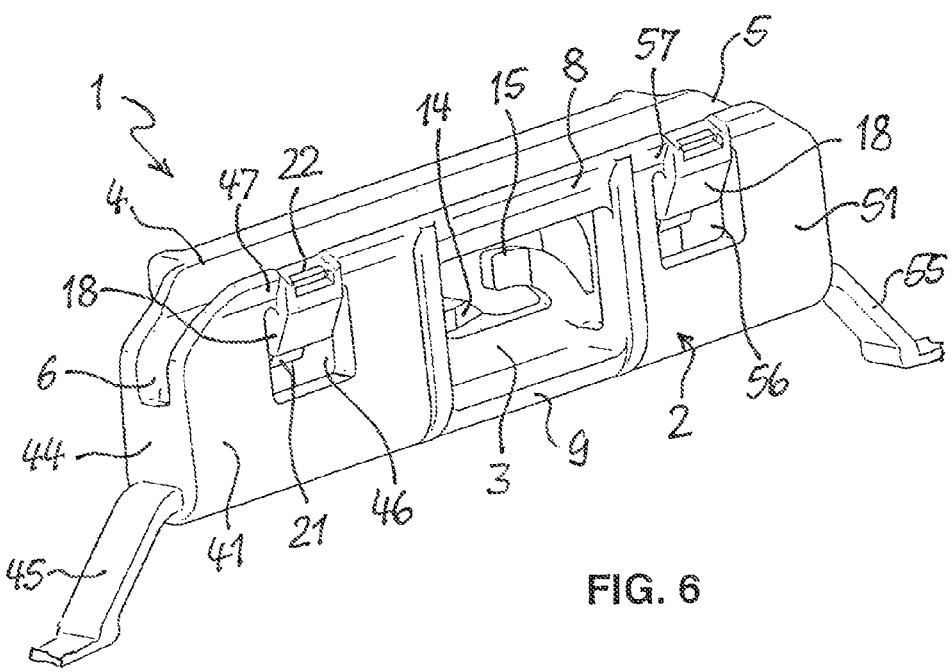
Figure 7:
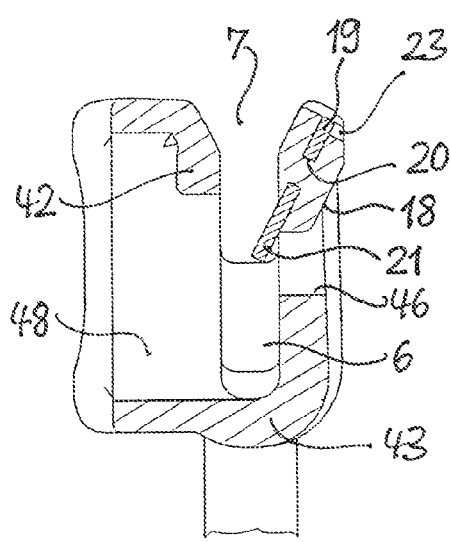

As is evident from FIG. 3, a guide channel 16 extending parallel to the lead-in slot 6 is formed on the back of the anchoring region 3; said channel terminates in the lead-in section 12 of the fastening aperture 10 and narrows towards the fastening aperture 10. The guide channel 16 facilitates entry into the fastening aperture 10 of the T-stud already attached to a component.

To secure a strip or rib inserted in the receiving slot 6, the clip 1 has two first locking fingers 18, with one first locking finger 18 being located on the first guide section 41 or 51 in each retaining region 4, 5. The locking fingers 18 are each located in an opening 46 or 56 of the relevant guide section 41, 51, and are molded as a single piece with the body 2. The guide sections 42, 52 are provided on the side opposite the locking fingers 18 with a core opening 48, 58 required by molding technology. At their ends next to the insertion opening 7, the locking fingers 18 are joined to the guide sections 41, 51 by elastically deformable webs 47, 57. The spring force exerted by the locking fingers 18 during fastening of a strip can be determined by the dimensioning of the cross-section of the webs 47, 57.

Each locking finger 18 contains an insert 19 made of corrosion-resistant metal, preferably stainless steel. The insert 19 is in the shape of a rectangular plate, which is embedded for most of its length in the plastic of the locking finger 18. However, the insert 19 can also have any other desired shape, although this shape must be matched to the locking finger. In the interior of the locking finger 18, the insert has a hole 20, which is filled with plastic and has the purpose of anchoring the insert 19 in the locking finger 18. The insert 19 forms a tongue 21, which projects out of the plastic material at the free end of the locking finger 18 and obliquely into the receiving slot 6. At the free end, the tongue 21 is provided with a sharp edge. The tongue 21 extends in the insertion direction at an angle of approximately 30° to the center plane of the receiving slot 6. The end 22 of the insert 19 opposite the tongue 21 is exposed in the region of a recess 23. As a result, the insert 19 can be supported at this location in the injection mold for molding the clip 1. The projecting tongue 21 forms a second support.

Figure 8:
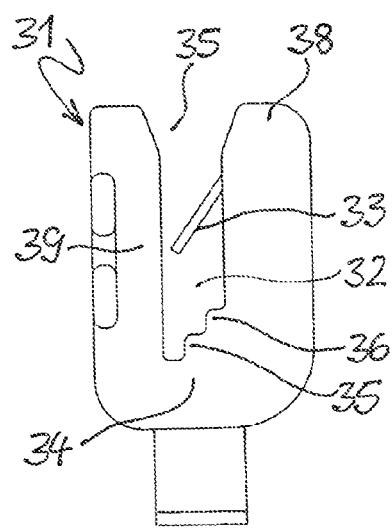

FIG. 8 shows a modified embodiment of a clip 31, which, aside from the features specified below, corresponds to the clip 1. The clip 31 has a receiving slot 32 of a width such that strips of greater or lesser wall thickness can be accommodated therein. While strips whose wall thickness corresponds to the width of the receiving slot, which is to say the width of its opening, can be held with sufficient stability and tilt-resistance in the receiving slot 32, this is not necessarily the case for strips with smaller wall thickness, due to the solely one-sided support on the tongues of the locking fingers 33. In order to improve the tilt-resistance of strips having a relatively small wall thickness, the rear section 34 of the clip 31 forms, on the inside facing the receiving slot 32, a stop with multiple steps 35, 36 arranged in a staircase fashion whose distance from the insertion opening 37 is proportional to their distance from the first guide section 38. The end faces of the steps 35, 36 facing the second guide section 39 each form a support for the edge regions of strips or ribs whose wall thickness is equal to or smaller than the distance between the end faces of the steps 35, 36 and the second guide section 39. As a result of this additional support, strips or ribs having a smaller wall thickness can be held in a tilt-resistant way. The number of steps and their height can be adapted to the particular requirements existing in each case with regard to the wall thickness of strips or ribs.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A clip for fastening to a component, in particular a strip or rib on a motor vehicle, the clip comprising:
    a single-piece body made of plastic and including a retaining region;
    a receiving slot partially defined by the retaining region and extending axially in the insertion direction, the receiving slot including;
        an insertion opening;
        a first guide section and a second guide section; and
        a first locking finger attached to the first guide section and extending from a fastening end to a free end axially in the insertion direction and transversely toward the second guide section, and
    the first locking finger includes an insert with a tongue portion projecting from the free end of the first locking finger; and
    wherein the first locking finger is located in an opening partially defined by the first guide section and is connected to the first guide section by an elastically deformable web.

2. A clip according to claim 1, wherein the insert is made of one of a group of materials comprising: a metal, a plastic reinforced with glass fibers, and a plastic reinforced with carbon fibers.

3. A clip according claim 1, wherein the first guide section and second guide section are connected to one another by a rear section located opposite the insertion opening and the rear section constitutes a stop for limiting the depth of the receiving slot in the insertion direction.

4. A clip according to claim 3, wherein the rear section includes a plurality of step portions arranged in a staircase fashion whose distance from the insertion opening decreases with increasing distance from the second guide section.

5. A clip according to claim 3, and further comprising a first elastic arm and a second elastic arm located on the rear section, and the elastic arms extend in directions that diverge and extend away from the guide sections.

6. A clip according to claim 1, further comprising an anchoring region that is adapted for fastening to the component.

7. A clip according to claim 6, wherein the anchoring region partially defines a keyhole-shaped fastening aperture adapted for receiving a T-stud located on a support part and has, associated with the fastening aperture, a second locking finger for holding the T-stud in place in the fastening aperture.

8. A clip according to claim 6, wherein a guide channel is formed in a back of the anchoring region, and the guide channel extends parallel to the receiving slot, terminates in the fastening aperture, and narrows towards the fastening aperture.

9. A clip according to claim 6, further comprising two retaining regions connected to one another by the anchoring region located between them.

10. A clip according to claim 9, wherein the two retaining regions each have first and second guide sections and the anchoring region connects the two second guide sections, and the two first guide sections are connected by a web on the side of the receiving slot opposite the anchoring region.

11. A clip according to claim 1, wherein the clip is formed by an injection molding process and the insert is partially encased in plastic by the molding process.

12. A clip according to claim 11, wherein the insert partially defines an opening into which the plastic of the body has penetrated.

13. A clip according to claim 1, wherein the insert includes a lateral shoulder, embedded in a region of the first guide section adjacent to the first locking finger.

14. A clip according to claim 1, wherein the fastening end of the first locking finger partially defines a recess in which an edge region of the insert opposing the tongue is exposed.

15. A clip for fastening to a component, in particular a strip or rib on a motor vehicle, the clip comprising:
    a single-piece body made of plastic and including a retaining region and an anchoring region;
    a receiving slot partially defined by the retaining region and extending axially in the insertion direction, the receiving slot including;
        an insertion opening;
        a first guide section and a second guide section; and
        a first locking finger attached to the first guide section and extending from a fastening end to a free end axially in the insertion direction and transversely toward the second guide section, and the first locking finger includes an insert with a tongue portion projecting from the free end of the locking finger; and wherein the anchoring region partially defines a keyhole-shaped fastening aperture adapted for receiving a T-stud located on a support part and has, associated with the fastening aperture, a second locking finger for holding the T-stud in place in the fastening aperture.

16. A clip according to claim 15, wherein the insert is made of one of a group of materials comprising: a metal, a plastic reinforced with glass fibers, and a plastic reinforced with carbon fibers.

17. A clip according claim 15, wherein the first guide section and second guide section are connected to one another by a rear section located opposite the insertion opening and the rear section constitutes a stop for limiting the depth of the receiving slot in the insertion direction.

18. A clip according to claim 15, wherein a guide channel is formed in a back of the anchoring region, and the guide channel extends parallel to the receiving slot, terminates in the fastening aperture, and narrows towards the fastening aperture.

19. A clip according to claim 15, further comprising two retaining regions connected to one another by the anchoring region located between them.

20. A clip according to claim 19, wherein the two retaining regions each have first and second guide sections and the anchoring region connects the two second guide sections, and the two first guide sections are connected by a web on the side of the receiving slot opposite the anchoring region.

\* \* \* \* \*